No. 11,853.
L. FLINKER. Reissued Sept. 4, 1900.
SAFETY GUARD ATTACHMENT FOR RAZOR BLADES.
(Application filed June 11, 1900.)
FIG. I
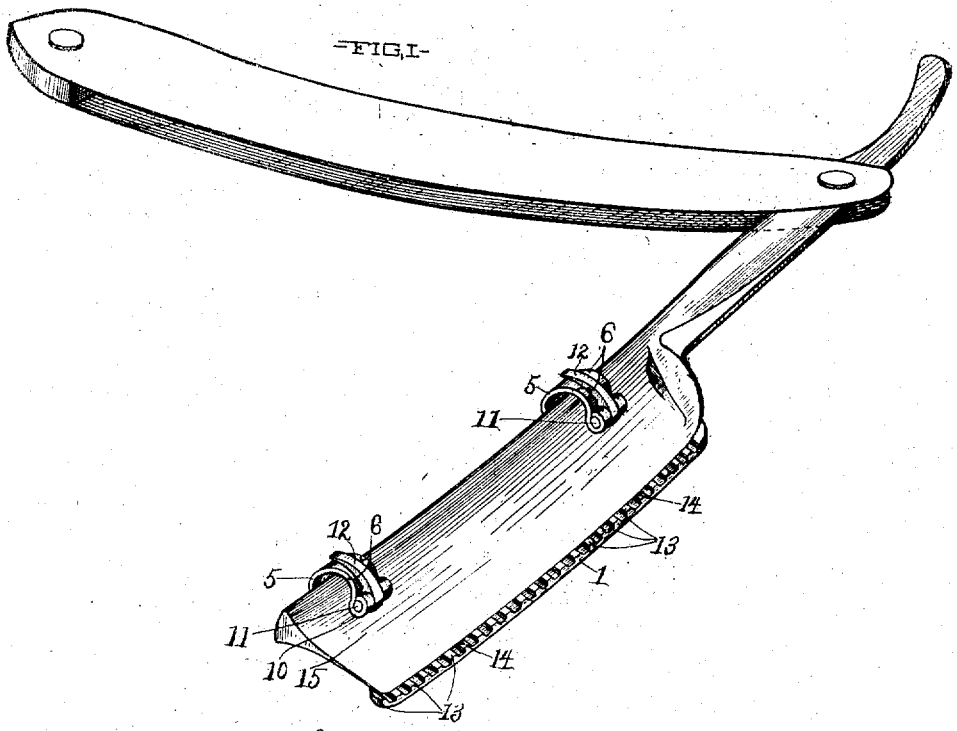
FIG. II
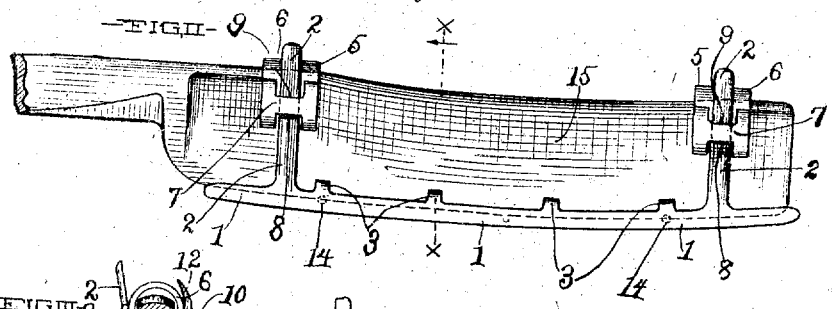
FIG. III
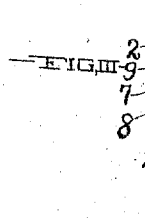
FIG. IV
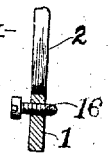
WITNESSES:
Daniel E. Daly.
Victor C. Lynch.
INVENTOR
Leon Flinker
BY
Lyman Dorer
his ATTORNEYS

UNITED STATES PATENT OFFICE.

LEON FLINKER, OF COLUMBUS, OHIO.

SAFETY-GUARD ATTACHMENT FOR RAZOR-BLADES.

SPECIFICATION forming part of Reissued Letters Patent No. 11,853, dated September 4, 1900.

Original No. 649,126, dated May 8, 1900. Application for reissue filed June 11, 1900. Serial No. 19,959.

*To all whom it may concern:*

Be it known that I, LEON FLINKER, a citizen of the United States, residing at Columbus, in the county of Franklin and State of Ohio, have invented a certain new and useful Improvement in Safety-Guard Attachments for Razor-Blades, of which the following is a specification.

My invention relates to improvements in safety attachments for razor-blades, and especially to that class of attachments wherein a guard-bar member is held in position by means of a supporting member or razor-blade-clamping member secured to the razor-blade.

The object of my invention is to provide a simple, reliable, and inexpensive device which may be readily attached to or removed from an ordinary razor-blade and which will prevent the cutting of the skin while shaving.

My invention consists in adjustably securing the guard-bar member and the supporting or razor-blade-clamping member together by means of a spring clamping device arranged on one of the members and adapted to frictionally engage the other member.

My invention also consists of certain details of construction and arrangement of parts, which will be hereinafter set forth in the specification, illustrated in the drawings, and pointed out in the claims.

Heretofore, as far as I am aware, in order to allow safety devices or attachments of this description to fit razor-blades of various widths the guard-bar member has been adjustably secured to the supporting or razor-blade-clamping member by means of bolts or screws. The use of bolts or screws in a device of this character is very objectionable for many reasons, and especially on account of the difficulty in obtaining the proper adjustment of the guard member by such means. By my construction I am able to do away entirely with the use of screws or bolts, as I secure the guard-bar member and the supporting or razor-blade-clamping member together by means of a spring clamping device arranged at their points of contact. I prefer to form this spring clamping device integral with one of the members, preferably integral with the supporting or razor-blade-clamping member, thus producing a combined supporting and clamping body, as shown in the drawings; but this is not essential, as the spring clamping device may be formed separately and adapted to frictionally engage both members.

My improved safety-guard attachment consists, essentially, of a supporting or razor-blade-clamping member, a guard-bar member, and a spring clamping device for securing the said two members together.

I shall hereinafter apply the term "supporting member" to that portion of my guard device which engages directly with the razor-blade and which I have hereinbefore designated as the "supporting or razor-blade-clamping member," thus preventing the confounding of this member with the clamping device which connects it with the guard member.

My preferred form of a supporting member consists of a metallic strip bent to form a round loop or clip. This loop or clip is preferably provided with means for increasing its tension, as will be more fully described hereinafter.

My guard-bar member consists, preferably, of a metallic strip having one or more upwardly-projecting arms, preferably two, as shown in the drawings. When the said strip is provided with two arms, the guard-bar member has a fanciful resemblance to a yoke and might therefore be termed in this particular construction a "yoke-body."

My spring clamping device for securing the guard-bar member to the supporting member consists of a strip of resilient metal having one end preferably rigid with one member and having a portion of its other end bent upon itself to form a clamping-jaw adapted to receive and grip a portion of the other member. In actual construction I prefer to form the supporting member and clamping device for securing the guard-bar member to the supporting member from a single strip of resilient material, thus obtaining what may be termed a "combined supporting and clamping body."

In the accompanying drawings I illustrate my preferred form of construction, in which—

Figure 1 is a view in perspective of a razor the blade of which is provided with my improved guard or safety device. Fig. 2 is a side elevation of the blade having the guard thereon. Fig. 3 is a sectional view on line *x x* of Fig. 2. Fig. 4 is an enlarged transverse section of the guard or yoke bar, illustrating a modified construction to be hereinafter explained.

Similar numerals refer to similar parts throughout the several views.

In carrying out my invention I employ a substantially yoke-shaped guard of metal or other suitable material, of which 1 is the horizontal bar, and 2 shows the parallel arms, which project, respectively, from points near the ends of said bar. In constructing the bar 1 I preferably form the inner face thereof and upper side with inwardly-projecting lugs 3, the latter being arranged at suitable intervals.

5 and 5 represent what I term my "combined supporting and clamping bodies," each of which consists of a razor-blade-clamping body formed integral with a spring clamping device for connecting it with the arm 2 of the guard member. Each of these combined supporting and clamping bodies is formed from a strip of resilient material, one end of which is bent to form a spring-clip adapted to engage the razor-blade and the other end is bent upon itself to form a friction-clamp adapted to engage the guard-bar. As indicated in the drawings, each of the clamps 5 is in the nature of a metallic strip which is formed with a double bend, producing a downturned loop portion 6 and an upturned loop portion 7, the former being in the nature of a rounded loop, while the latter is bent inward to a partially-flattened form. As indicated at 8, I form in the lower side and partially in the outer face of the loop portion 7 a slotted opening, and, as indicated at 9, I form in the upper edge portion of the outturned member 7, in alinement with said opening 8, a recess or notch. In the lower end or termination of the loop portion 6 I form an upturned hinge-roll 10, which is divided by a slotted opening or central recess formed partially in said roll and partially in the adjoining end portion of the loop portion 6. Bearing in each pair of these hinge-rolls are the end portions of a transverse hinge-pin 11, on which is mounted centrally the head portion of a curved cam-lever 12, the head of the latter beyond its pivot or hinge point being adapted to project within the loop 6 when said lever is thrown upward to the position indicated in the drawings.

On the inner face of the yoke-bar 1 I preferably form transverse corrugations 13, and on this corrugated face at equidistant points from the outer edge of the bar 1 I form two or more small indentations 14.

The manner of connecting the yoke with the blade-clamps consists in inserting the yoke-arms 2 through the slotted openings 8 of said clamps, thence upward between the inner and outer portions of the loop 7, these loops being sufficiently flattened and having sufficient resiliency to form friction-clamps for said yoke-arms, retaining the latter in the positions to which they are forced.

In order to illustrate the use of my device, I have shown the same in position for use on a razor-blade, which is indicated at 15. It will be seen from this illustration that the back of the blade is adapted to be inserted within the loop portions 6 of the clamps 5, said blade being adapted to be temporarily locked in this position by pressing upward the cam-lever arms 12 until the heads thereof contact with the outer side of the blade with sufficient firmness to bind the latter within said loops.

In order to get a proper adjustment of the guard with relation to the cutting edge of the razor-blade, I have provided the guide indentations 14, which indicate the line to which said blade edge should extend.

It will be observed that the inwardly-projecting lugs 3, which I form with the bar 1, will by contact with the side of the razor-blade serve to hold the bar 1 in desirable parallel alinement with said blade and away from the latter. In Fig. 4 of the drawings I have shown as a substitute for each of the fixed lugs 3 a set-screw 16, the latter having threaded engagements with screw-holes formed in said bar 1 and the ends of the screws being adapted to abut against the razor-blade. In this manner the distance between the yoke-bar and razor-blade may be regulated at will.

In utilizing a razor having my improved guard thereon it will be observed that the corrugations 13, which I preferably form in the face of the bar 1, will facilitate the passage between the guard and blade of the lather.

From the construction above described it will be seen that by forcing inward or outward the arms 2 of the yoke the position of the bar 1 may be regulated for use on razors having blades of various sizes, and that the means of attaining this regulation or adjustment are exceedingly simple and positive. Also the guide-marks which I provide on the guard-bar for indicating the proper position of the guard-bar on the razor-blade enable this adjustment to be readily and accurately obtained without guess-work or experimenting on the part of the user.

What I claim is—

1. A safety-guard attachment for razor-blades, comprising a supporting member adapted to be secured to the razor-blade a guard-bar and a friction-clamp for adjustably securing said guard-bar to the supporting member, substantially as described and for the purpose set forth.

2. A razor-guard comprising, a guard-bar, a supporting device for suspending said guard-bar from the razor-blade, and a spring clamping device for adjustably securing said guard-bar to the said supporting device, substantially as described and for the purpose set forth.

3. A safety-guard attachment for razor-blades comprising, a guard-bar, a supporting member, means for locking said supporting member on the razor-blade, and a spring clamping device forming an operative connection between the supporting member and the guard-bar, substantially as described and for the purpose set forth.

4. A safety-guard attachment for razor-blades comprising, a guard-bar, a supporting member adapted to be secured to the razor-blade, and a spring clamping device formed integral with the said supporting member, and adapted to hold the said guard-bar in frictional engagement with the supporting member, substantially as described and for the purpose set forth.

5. In a safety-guard attachment for razor-blades, a guard-bar and a combined supporting and clamping body consisting of a strip of resilient material, one end of which is bent to form a loop adapted to engage the razor-blade, and the other end is bent upon itself to form a spring-clamp for frictionally engaging the guard-bar, substantially as described.

6. An adjustable safety-guard attachment for razor-blades, comprising a guard-bar, a supporting member comprising a strip of material bent to form a loop adapted to engage the razor-blade, and means for increasing or decreasing the tension of said loop, and a spring-clamp formed integral with one end of said supporting member and adapted to frictionally engage the guard-bar, substantially as described and for the purpose set forth.

7. In an adjustable safety-guard attachment for razor-blades, a combined supporting and clamping member comprising upwardly and downwardly bent loop portions, the upwardly-bent loop portion having an opening through its inner end, substantially as described and for the purpose set forth.

8. In a safety-guard attachment for razor-blades, a guard-bar provided with guide-marks arranged on the face adjacent to the razor-blade, substantially as described and for the purpose set forth.

9. In a safety-guard attachment for razor-blades, a guard-bar having a smooth outer face and provided, on its inner face, with projections, guide-marks and corrugations, substantially as described and for the purpose set forth.

10. In a safety-guard for razors, the combination with the guard-bar member comprising a yoke-body consisting of the bar 1 and arms 2 of combined supporting and clamping bodies 5, each comprising upwardly and downwardly bent loop portions, the loop 7 having an opening through its inner end adapted to engage arms 2, substantially as described.

11. In a safety-guard attachment for razor-blades, the combination with a guard-bar member comprising a yoke-body consisting of a bar 1 having projections on its inner face arranged at intervals, and arms 2 of two combined supporting and clamping bodies 5, each consisting of an upwardly and downwardly bent loop portion, said upwardly-bent loop being provided with an opening and adapted to receive and clamp the arms of said yoke, substantially as specified.

12. In a safety-guard for razors, the combination with the guard-bar member comprising a yoke-body consisting of the bar 1 and arms 2 of combined supporting and clamping bodies 5, each comprising upwardly and downwardly bent loop portions, the loop 7 having an opening through its inner end adapted to engage arms 2, and a cam-lever fulcrumed in the outer portion of the loop 6, substantially as specified.

13. In a safety-guard attachment for razor-blades, the combination with the guard-bar member comprising a yoke-body consisting of a bar 1 having projections on its inner face arranged at intervals, and arms 2 of combined supporting and clamping bodies 5, each consisting of an upwardly and downwardly bent loop portion, said upwardly-bent loop being provided with an opening and adapted to receive and clamp the arms of said yoke, and a cam-lever fulcrumed in the downwardly bent loop portion, substantially as specified.

14. In a safety-guard attachment for razor-blades, the combination with the guard-bar member comprising a yoke-body consisting of a bar 1 and arms 2, said bars having separated indentations or guide-marks 14 on its inner face, of combined supporting and clamping bodies 5 having oppositely-bent loop portions adapted to respectively embrace the back of the razor-blade and the arms of said yoke-body, substantially as specified.

15. In a safety-guard attachment for razor-blades, the combination with a supporting member, of a guard-bar and means for indicating the proper adjustment of said guard-bar to the edge of the razor-blade, for the purpose set forth.

Signed by me at Cleveland, Ohio, this 7th day of June, 1900.

LEON FLINKER.

Witnesses:
VICTOR C. LYNCH,
A. H. PARRATT.